US009157782B2

(12) United States Patent
Berberich et al.

(10) Patent No.: US 9,157,782 B2
(45) Date of Patent: Oct. 13, 2015

(54) COVERSLIPPING MACHINE HAVING AN OPTICAL LIMIT FILL LEVEL MEASURING DEVICE FOR A LIQUID

(71) Applicant: Leica Biosystems Nussloch GmbH, Nussloch (DE)

(72) Inventors: Markus Berberich, Heildelberg (DE); Christian Wilke, Rimbach (DE); Tobias Trump, Frankenthal (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 305 days.

(21) Appl. No.: 13/781,879

(22) Filed: Mar. 1, 2013

(65) Prior Publication Data

US 2013/0233071 A1    Sep. 12, 2013

(30) Foreign Application Priority Data

Mar. 8, 2012   (DE) .................. 10 2012 203 686

(51) Int. Cl.
*G01F 23/00*  (2006.01)
*G01F 23/292* (2006.01)

(52) U.S. Cl.
CPC ............ *G01F 23/00* (2013.01); *G01F 23/2921* (2013.01)

(58) Field of Classification Search
CPC . G01F 23/00; G01F 23/0292; G01F 23/2921; G01F 23/2927; G01F 23/02
USPC ......................................................... 73/293
See application file for complete search history.

(56) References Cited

U.S. PATENT DOCUMENTS

| | | | | |
|---|---|---|---|---|
| 1,955,315 A * | 4/1934 | Styer | ............................. | 340/626 |
| 2,980,802 A * | 4/1961 | Bracey et al. | ................. | 250/577 |
| 3,446,222 A * | 5/1969 | Barker | .............. | 137/2 |
| 3,549,893 A * | 12/1970 | Gibbs | .......................... | 250/577 |
| 3,636,360 A * | 1/1972 | Oishi et al. | .................... | 250/577 |
| 4,193,004 A * | 3/1980 | Lobdell et al. | ............... | 250/577 |
| 4,297,588 A * | 10/1981 | Hastbacka | .................... | 250/577 |
| 4,920,336 A * | 4/1990 | Meijer | .......................... | 340/619 |
| 4,989,452 A * | 2/1991 | Toon et al. | ...................... | 73/293 |
| 5,747,824 A * | 5/1998 | Jung et al. | ..................... | 250/577 |
| 7,500,386 B2 * | 3/2009 | Togashi et al. | .............. | 73/61.55 |
| 7,566,366 B2 * | 7/2009 | Kiene | .......................... | 118/302 |
| 2004/0149896 A1 | 8/2004 | Seethaler | | |

(Continued)

FOREIGN PATENT DOCUMENTS

AT           413 762         5/2006
DE          20 50 764         4/1971

(Continued)

*Primary Examiner* — Herzon E Williams
*Assistant Examiner* — Rodney T Frank
(74) *Attorney, Agent, or Firm* — Hodgson Russ LLP

(57) ABSTRACT

The present invention relates to a coverslipping machine (1) including: a hollow needle (2) for applying mounting medium onto a specimen slide (5); a transparent container (103) to be filled with a liquid; a light source (101) for radiating measurement light in a principal radiating direction (A) into the container (103); and a light sensor (102, 102') for detecting the measurement light, the light source (101) being arranged with respect to the container (103) in such a way that the radiated measurement light is refracted by a liquid in the container whose fill level exceeds a fill level limit, the light sensor (102, 102') being arranged with respect to the container (103) in such a way that only measurement light refracted by the liquid or only measurement light not refracted by the liquid is detected.

12 Claims, 3 Drawing Sheets

(56) References Cited

U.S. PATENT DOCUMENTS

| | | |
|---|---|---|
| 2005/0186114 A1 | 8/2005 | Reinhardt et al. |
| 2009/0151447 A1 | 6/2009 | Jin et al. |

FOREIGN PATENT DOCUMENTS

| | | |
|---|---|---|
| DE | 295 14 506 | 9/1995 |
| DE | 102 01 770 | 7/2003 |
| DE | 103 27 872 | 1/2004 |
| DE | 10 2005 020 426 | 11/2006 |
| EP | 0 258 834 | 3/1988 |
| EP | 1 624 301 | 2/2006 |
| EP | 1 873 501 | 1/2008 |
| EP | 2 069 750 | 2/2008 |
| GB | 2 035 561 | 6/1980 |
| JP | 63-281021 | 11/1988 |
| JP | 2004333301 | 11/2004 |
| JP | 2006010597 | 1/2006 |
| WO | 2011/032960 | 3/2011 |

\* cited by examiner ically claims priority of German patent application number 10 2012 203 686.5 filed Mar. 8, 2012, the entire disclosure of which is incorporated by reference herein.

COVERSLIPPING MACHINE HAVING AN OPTICAL LIMIT FILL LEVEL MEASURING DEVICE FOR A LIQUID

CROSS REFERENCE TO RELATED APPLICATIONS

This application claims priority of German patent application number 10 2012 203 686.5 filed Mar. 8, 2012, the entire disclosure of which is incorporated by reference herein.

FIELD OF THE INVENTION

The present invention relates to a coverslipping machine having an optical limit fill level measuring device for a liquid, and to a method for detecting a limit fill level of a liquid in a container.

BACKGROUND OF THE INVENTION

Coverslipping machines are used in histology in order to coverslip specimen slides on which, for example, tissue sections are located. It is known for this purpose to apply a mounting medium (a kind of liquid adhesive) in metered fashion onto the specimen slide by means of a hollow needle, and then to press on a coverslip for sealing. A coverslipping machine of this kind is marketed, for example, by the Applicant under the designation "Leica CV5030."

When the coverslipping machine is not in use, or during stoppage times, the risk exists that the mounting medium may dry out in the hollow needle and thereby clog it. Depending on the ambient temperature, mounting medium can already begin to dry in only a few minutes. To decrease this risk, DE 10 2005 020 426 A1 describes a cleaning device for the hollow needle which comprises a brush and a solvent container connected to the brush. The hollow needle is inserted into the solvent-wetted brush for cleaning.

In light of this existing art, automatic limit level detection e.g. for the solvent is desirable. This allows drying of the cleaning device to be avoided. The measures should be easy to implement but nevertheless robust and reliable, in order to function dependably over a long period of time even in a laboratory environment.

SUMMARY OF THE INVENTION

The present invention proposes a coverslipping machine as well as a method for detecting a limit fill level of a liquid in a container, having the features described herein. Advantageous embodiments are described in the description that follows.

A limit fill level measurement system and method that are easy to implement and nevertheless operates robustly and reliably are presented in the context of the invention. The limit fill level measurement system and method require only a light source, a light sensor, and a transparent container, for example a hollow cylinder (such as a test tube) or a hollow cuboid (such as a cuvette). The light source (e.g. a light-emitting or laser diode) and light sensor (e.g. a photodiode) can be well encapsulated so that they are insensitive even to solvent vapors. The limit fill level to be detected is defined by the arrangement of the light source and light sensor with reference to the container. The measurement principle exploits the refraction, in the liquid, of the light radiated from the light source. The light source and light sensor can thus be arranged with reference to the container in such a way that only unrefracted measurement light (i.e. liquid is below the limit fill level) or only refracted measurement light (i.e. liquid is above the limit fill level) reaches the light sensor. This is determined substantially by whether the light sensor is arranged in the principal radiating direction of the light source, or in the direction of the refraction angle. Detection reliability is increased if only refracted light is detected, since a failure of the sensor apparatus (e.g. light source, light sensor, measurement electronics) or a malfunction (e.g. foreign object in the light path) results, as does a fill level that is too low, in an absence of the measurement signal.

The limit fill level measurement system and method according to the present invention can be used to monitor an upper or lower limit fill level, i.e. to monitor an overflow or an empty condition. The geometrical arrangement of the light source, container, and light sensor offers numerous degrees of freedom that permit optimum coordination between detection and the particular intended use. Included among the degrees of freedom are, in particular, a principal radiating direction of the light source, an angle of incidence onto the container or liquid, and a detection direction of the light sensor. For example, the light source can be oriented so that the container is transilluminated substantially horizontally. The light source can likewise be oriented so that the container is transilluminated at an angle to the horizontal, for example 45°. The measurement light can be directed onto a container wall or directly onto the liquid. An angle of incidence of approximately 45° proves advantageous.

Two or more sensors can also be used in order to ensure two-channel measurement and/or mutual monitoring or redundancy. According to a particularly preferred embodiment, at least one first light sensor is arranged so that only refracted measurement light (i.e. liquid is above the limit fill level) reaches it, and at least one second light sensor is arranged so that only unrefracted measurement light (i.e. liquid is below the limit fill level) reaches it. Only one of the sensor at a time then supplies a signal, depending on the fill level.

The limit fill level measurement system and method according to the present invention can be utilized in particular in laboratory devices in which fill levels need to be monitored. Utilization in medical fields such as histology is particularly advantageous, since sufficiently transparent liquids are usually used therein. The invention is used particularly preferably in coverslipping machines to monitor fill levels of solvent and/or mounting medium. Solvents are used here, for example, to protect the hollow needle from drying out. A typical solvent is water or alcohol, or a so-called "dissolvent" (e.g. volatile organic substances having a boiling point of up to 200° C. per TRGS 610 (Technical rules for hazardous substances)). The hollow needle can, for example, be inserted into a solvent-wetted brush, as described in DE 10 2005 020 426 A1. A sufficient solvent level is important in order to prevent the brush from drying out. In a particularly preferred embodiment, the hollow needle can also be parked in a container having solvent, i.e. immersed in solvent. For this, however, the fill level of the solvent in the container should not fall below a certain minimum fill level, in order to ensure that the hollow needle is immersed in solvent. Because experience indicates that solvents evaporate quickly, this simple and particularly useful approach is made possible in practice only by the limit fill level monitoring system according to the present invention.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and is described in detail below with reference to the drawings.

DETAILED DESCRIPTION OF THE INVENTION

A preferred embodiment of a limit fill level measuring device 100 will be explained below with reference to FIGS. 1a and 1b.

Limit fill level measuring device 100 is depicted here in plan view, and comprises a light source embodied here as light-emitting diode 101, and a light sensor embodied here as photodiode 102. Arranged between light-emitting diode 101 and photodiode 102 is a container, embodied here as hollow cylinder 103 (e.g. a test tube), into which the liquid to be monitored has been introduced.

Light-emitting diode 101 radiates directed or focused measurement light in a principal radiating direction A that here is substantially horizontal (i.e. the principal radiating direction extends at most at a very small angle to a horizontal plane, e.g. less than 5° or less than 1°). Photodiode 102 is arranged here in principal radiating direction A, so that measurement light that is radiated from light-emitting diode 101 reaches photodiode 102 only in substantially straight-line fashion. The measurement light is incident at an angle of approx. 45° onto the outer wall (more precisely the enveloping surface) of the container. The vertical height at which the measurement light passes through the transparent hollow cylinder 103 at the same time defines the limit fill level to be monitored.

The invention allows a limit fill level of any liquids to be monitored, provided they are sufficiently transparent and their refractive index differs sufficiently from the refractive index of air.

Figure 1A:
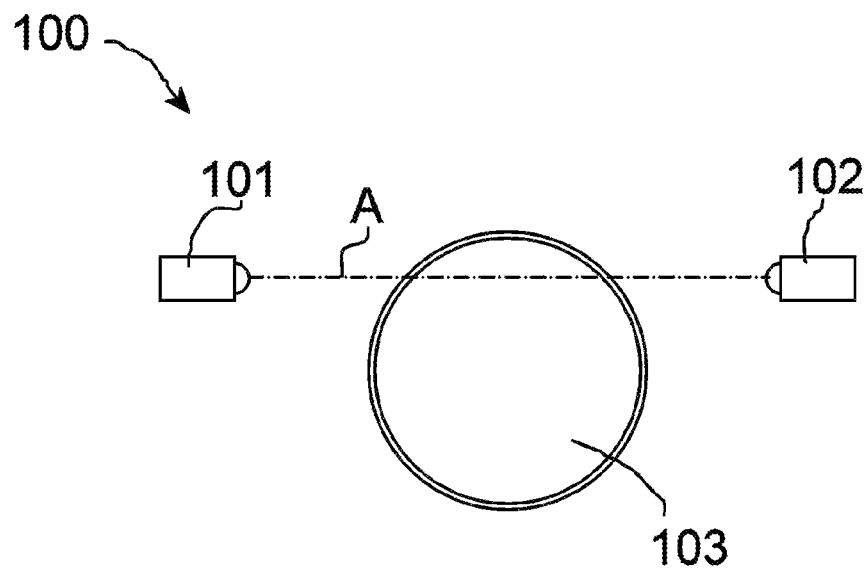
FIG. 1a is a plan view of a preferred embodiment of a limit fill level measuring device according to the present invention, with a liquid level below the limit fill level.

If insufficient liquid is present in test tube 103, i.e. if the fill level of the liquid is below the limit fill level, the measurement light shines through only the transparent container wall and air, and is consequently not appreciably refracted out of principal radiating direction A, as depicted in FIG. 1a. The measurement light reaches photodiode 102, and a measurement signal is generated.

Figure 1B:
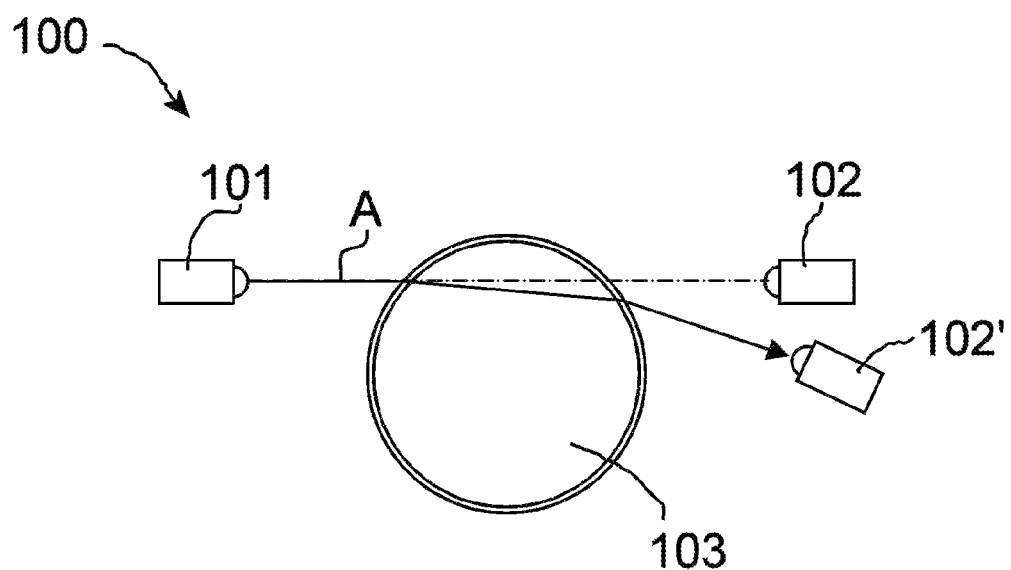
FIG. 1b shows the embodiment according to FIG. 1a with a liquid level above the limit fill level.

If sufficient liquid is present in test tube 103, i.e. if the fill level of the liquid is above the limit fill level, the measurement light shines through the liquid and is consequently refracted out of principal radiating direction A, as depicted in FIG. 1b. The selected arrangement of the elements (horizontal principal radiating direction, approx. 45° angle of incidence onto container wall) results in a refraction such that a horizontal beam deflection occurs.

After shining through test tube 103 filled with sufficient liquid, the beam direction of the measurement light deviates far enough from principal radiating direction A that it can no longer enter light sensor 102. No measurement signal is generated there.

The present embodiment of limit fill level measuring device 100 is therefore configured so that photodiode 102 generates a measurement signal whenever the liquid level is below the limit fill level. The measurement signal can be used, for example, as a warning signal in order to indicate a shortage of liquid.

An alternative embodiment, in which the photodiode generates a measurement signal whenever the liquid level is above the limit fill level, is obtained when a light sensor 102' is arranged in the direction (arrow) in which the measurement light is deflected in FIG. 1b. This arrangement offers greater reliability, since a measurement failure or malfunction results in absence of the signal, and a warning is thus generated; with the example above, however, a measurement failure or malfunction may possible remain undiscovered.

A self-testing arrangement can be made available if both light sensors 102, 102' are present.

As explained below with reference to FIGS. 2 and 3, a limit fill level measuring device according to the present invention is usable preferably in coverslipping machines in order, in particular, to monitor the fill level of a solvent in a container in which a hollow needle, with which mounting medium is discharged, is stored during breaks and/or longer stoppages.

Figure 2:
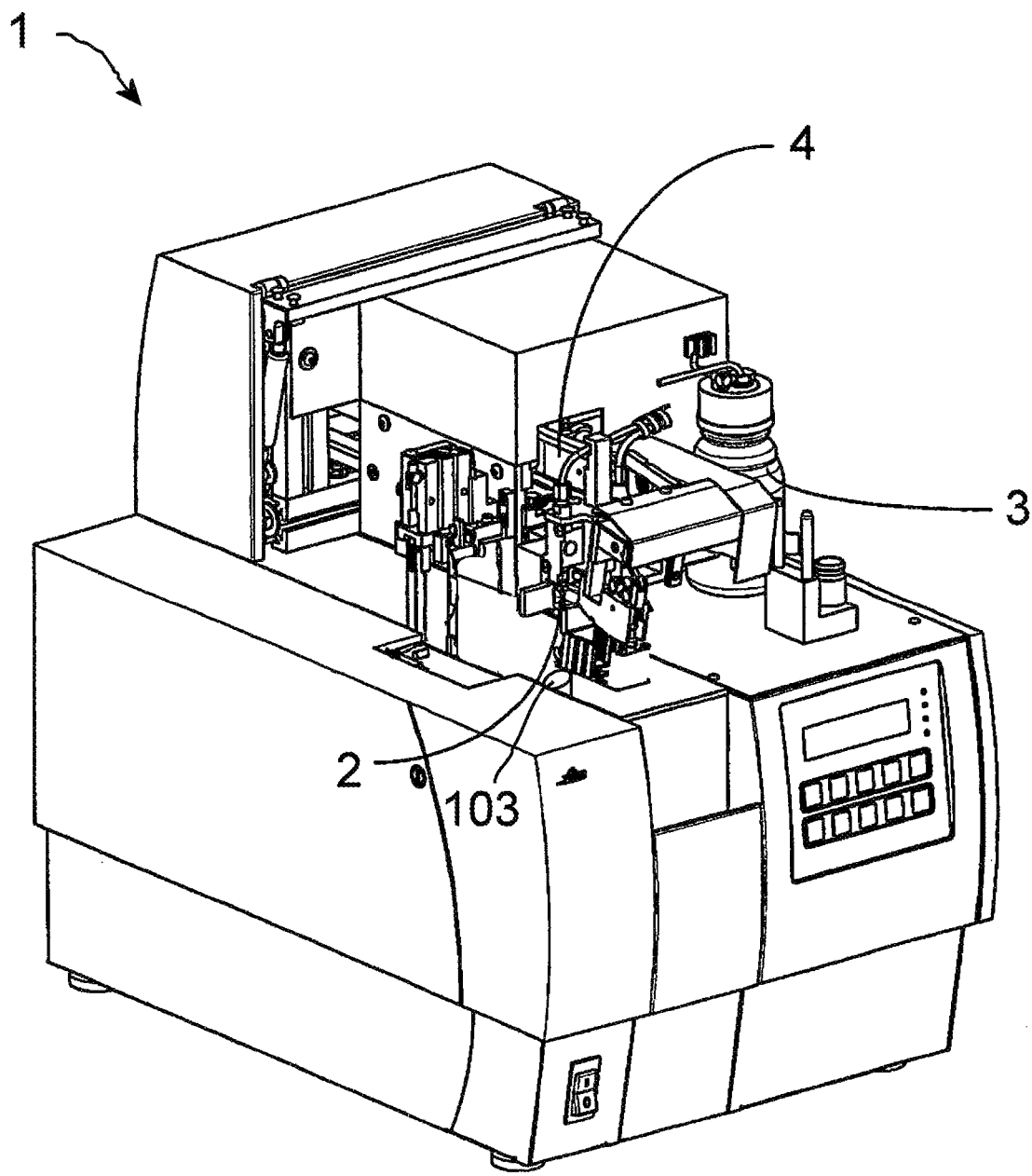
FIG. 2 shows a preferred embodiment of a coverslipping machine according to the present invention having a solvent container and a limit fill level measuring device.

FIG. 2 is a view of coverslipping machine 1 having a hollow needle 2 with which mounting medium (usually a kind of liquid adhesive) is applied from a reservoir container 3 onto a specimen slide (not depicted). Hollow needle 2 is arranged on a guide 4, and is movable up and down along said guide 4.

Hollow needle 2 is movable along guide 4 into a working position in order to apply the mounting medium, and into a parked position for cleaning or storage. Coverslipping machine 1 possesses at the parked position a container 103, filled with solvent, into which the hollow needle is immersed during breaks and stoppages in order to prevent drying. A control device having a timer can, for example, be provided for this purpose, said device automatically dipping the hollow needle into the solvent after a specific definable period of non-use. A minimum quantity of solvent must be stored in the container so that the hollow needle does in fact come into contact with solvent when dipped. In order to monitor an (in this case, lower) limit fill level of solvent in container 103, coverslipping machine 1 is equipped with a preferred embodiment of a limit fill level measuring device 100 according to the present invention.

Figure 3:
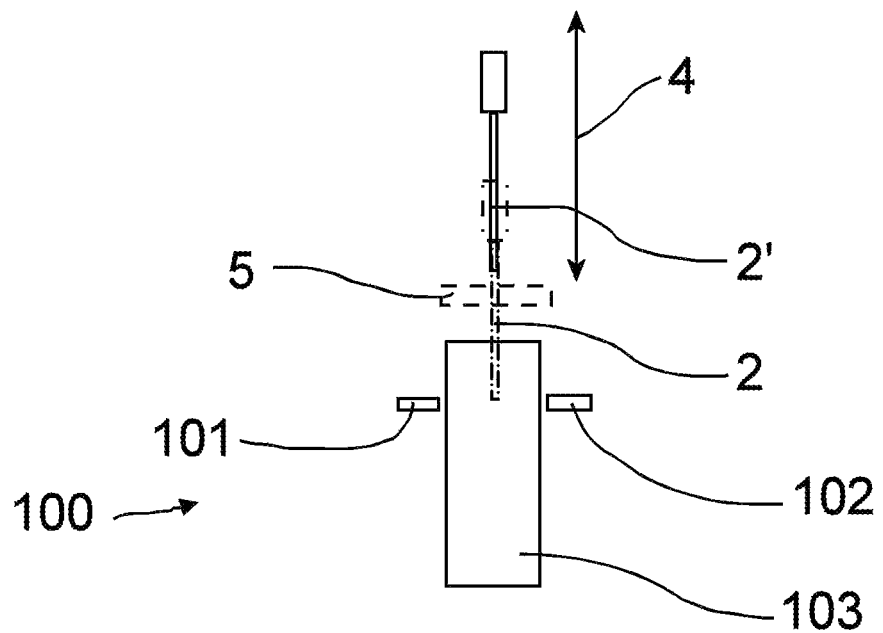
FIG. 3 shows a working position and a parked position of a hollow needle of the coverslipping machine in relation to the limit fill level measuring device.

FIG. 3 shows the arrangement of hollow needle 2 and container 103 in more detail in a cross-sectional view, from which it is apparent that hollow needle 2 is movable along guide 4 into the working position (top, solid line, labeled 2'), in which it is arranged above specimen slides 5 that are to be coverslipped, and into the parked position (bottom, dot-dash line, labeled 2), in which it is arranged in container 103. The movement of specimen slides to be coverslipped occurs in a plane substantially perpendicular to the movement direction of hollow needle 2 (in (X) or perpendicular (Y) to the drawing plane (XZ)). The hollow needle is thus preferably mounted movably only in one direction (here the Z direction), so that only a few physical provisions, guides, motors, etc. are necessary.

The invention is not to be limited to the specific embodiments disclosed, and modifications and other embodiments are intended to be included within the scope of the invention.

What is claimed is:

1. A coverslipping machine (1), comprising:
   a hollow needle (2) for applying mounting medium onto a specimen slide (5);
   a transparent container (103) to be filled with a liquid;
   a light source (101) for radiating measurement light in a principal radiating direction (A) into the container (103); and
   a light sensor (102, 102') for detecting the measurement light;
   wherein the light source (101) is arranged with respect to the container (103) such that the radiated measurement light is refracted by the liquid in the container whose fill level exceeds a fill level limit;
   wherein the light sensor (102, 102') is arranged with respect to the container (103) such that measurement light refracted by the liquid or measurement light not refracted by the liquid is detected;
   wherein the container (103) is configured to receive the hollow needle (2);
   wherein in a working position in which the mounting medium is applied onto the specimen slide (5), the hollow needle (2) is located above the container (103).

2. The coverslipping machine according to claim 1, wherein the angle of incidence of the measurement light onto the container (103) is greater than 10° and less than 80°.

3. The coverslipping machine according to claim 1, wherein the angle of incidence of the measurement light onto the container (103) is greater than 40° and less than 60°.

4. The coverslipping machine according to claim 1, wherein the principal radiating direction (A) encloses with a horizontal plane an angle smaller than 45°.

5. The coverslipping machine according to claim 1, wherein the principal radiating direction (A) encloses with a horizontal plane an angle smaller than 5°.

6. The coverslipping machine according to claim 4, wherein the principal radiating direction (A) is substantially horizontal.

7. The coverslipping machine according to claim 1, wherein the container (103) is a hollow cylinder or a hollow cuboid.

8. The coverslipping machine according to claim 1, wherein the light source (101) includes a light-emitting diode or laser diode.

9. The coverslipping machine according to claim 1, wherein the light sensor (102, 102') includes a photodiode.

10. The coverslipping machine according to claim 1, further comprising a second light sensor (102, 102'), a first (102') of the light sensor or the second light sensor being arranged in such a way that only measurement light refracted by the liquid is detected by the first light sensor (102'); and
    a second (102) of the light sensor or the second light sensor being arranged in such a way that only measurement light not refracted by the liquid is detected by the second light sensor (102).

11. The coverslipping machine (1) according to claim 1, wherein the container (103) is a solvent container of a device for cleaning the hollow needle (2), or a container for the mounting medium.

12. The coverslipping machine (1) according to claim 1, wherein in the working position, the hollow needle (2) is located above the container (103) in such a way that the hollow needle (2) can be introduced into the container (103) by a purely vertical motion out of the working position.

* * * * *